United States Patent [19]

Paschal

[11] Patent Number: 5,661,473

[45] Date of Patent: Aug. 26, 1997

[54] SYSTEM FOR THE IDENTIFICATION AND AUTOMATIC DETECTION OF VEHICLES OR OBJECTS

[75] Inventor: Jean-Pierre Paschal, Suresnes, France

[73] Assignee: Thomson-CSF, Puteaux, France

[21] Appl. No.: 345,362

[22] Filed: Nov. 18, 1994

Related U.S. Application Data

[63] Continuation of Ser. No. 65,762, May 24, 1993, abandoned.

[30] Foreign Application Priority Data

May 26, 1992 [FR] France ................. 92 06432

[51] Int. Cl.$^6$ ................................. G08G 1/01
[52] U.S. Cl. ............... 340/933; 340/928; 340/825.15; 340/825.34; 340/825.54; 307/10.4; 307/10.5
[58] Field of Search ................. 340/933, 928, 340/936, 937, 825.15, 825.16, 825.27, 825.33, 825.34, 825.54

[56] References Cited

U.S. PATENT DOCUMENTS

| 4,591,823 | 5/1986 | Horvat ................. 340/936 |
| 4,918,425 | 4/1990 | Greenberg et al. ........ 340/539 |
| 4,982,070 | 1/1991 | Bezin et al. ............. 235/378 |
| 5,204,675 | 4/1993 | Sekine ................... 340/933 |
| 5,266,785 | 11/1993 | Suglhava et al. ......... 235/384 |
| 5,339,000 | 8/1994 | Bashan et al. ........... 340/928 |

FOREIGN PATENT DOCUMENTS

| 0245555 | 11/1987 | European Pat. Off. . |
| 0246960 | 11/1987 | France . |
| 2656449 | 6/1991 | France . |
| 2667554 | 4/1992 | France . |
| 2186409 | 8/1987 | United Kingdom . |

Primary Examiner—Jeffery Hofsass
Assistant Examiner—Daryl C. Pope
Attorney, Agent, or Firm—Oblon, Spivak, McClelland, Maier & Neustadt, P.C.

[57] ABSTRACT

A system for the identification and automatic detection of vehicles or objects includes an electronic label installed in each of the vehicles or objects, each of these electronic labels having means for memorizing an identification code assigned to a vehicle or object in which the electronic label is installed and radioelectrical transmission and reception means for transmitting this identification code, and at least one mobile reader disposed exterior to the vehicles or objects and movable within a vicinity of these vehicles or objects. Each mobile reader includes a recording memory for recording a file of identification codes of vehicles or objects to be identified, radioelectrical means for transmitting a signal to at least one of the vehicles or objects which prompts the electronic labels of these vehicles or objects to transmit identification codes assigned to these vehicles or objects to the radioelectrical means, comparison means for comparing the identification codes recorded in the file of the recording memory with each identification code transmitted by the electronic labels, and reporting means for reporting to authorities the presence of any vehicle or object whose identification code appears in the file of the recorded memory, as determined by the comparison means. The invention finds particular utility in the automatic detection of stolen vehicles, the purchase of second hand vehicles, and identity checks on motorists.

12 Claims, 3 Drawing Sheets

SYSTEM FOR THE IDENTIFICATION AND AUTOMATIC DETECTION OF VEHICLES OR OBJECTS

This application is a continuation of application Ser. No. 08/065,762, filed on May 24, 1993, now abandoned.

BACKGROUND OF THE INVENTION

1. Field of the Invention

The present invention relates to a system for the identification and automatic detection of vehicles or objects.

It can be applied notably to the detection of stolen vehicles.

2. Description of the Prior Art

A known way of coping with the shortcomings of sound alarms in vehicles consists of placing concealed electronic markers on these vehicles, so that stolen vehicles can then be identified by means of a detection infrastructure, installed at given places in a territory. A device of this type has been described, for example, in the French patent application No. 2 656 449 filed on behalf of the firm VOLBACK registered under French law.

However this approach, which is very costly, also unreliable because it calls for the setting up of a very large number of electromagnetic sensors on well-localized road circuits in a territory. This makes it necessary to guide the vehicles over the sensors and hence dissuades thieves from taking the roads on which the sensors are installed. Moreover, an informed thief can always detect the presence of a marker on the vehicle that he has stolen and then destroy or neutralize it by covering it, for example, with a metal screen that cuts off all electromagnetic radiation between the marker and the sensor. Consequently, a stolen vehicle can always move about without it being possible to detect its presence on a route where sensors are installed.

SUMMARY OF THE INVENTION

The aim of the invention is to overcome the above-mentioned drawbacks.

To this end, an object of the invention is a system for the identification and automatic detection of vehicles or objects comprising:

in each identifiable vehicle or object, an electronic label provided with radioelectrical transmission and reception means to transmit and memorize an identification code of the vehicle or object, and outside each vehicle or object, at least one mobile reader that can be moved about as desired in the vicinity of identifiable vehicles or objects, said reader comprising:

a memory for the recording of a file of identification codes of objects or vehicles to be identified;

radioelectrical means for the interrogation of the labels to prompt the transmission of the identification codes of the vehicles or objects;

means for the comparison of the identification codes contained in the file with those transmitted by the labels;

reporting means to immediately report the presence of vehicles whose identification codes correspond to those memorized in the file.

The main advantage of the invention is that it can be used to provide law-enforcement agencies, such as the police force or the constabulary for example, or insurance agencies with efficient means for the identification of stolen vehicles. These agencies could then be alerted and could take the necessary measures as soon as a stolen vehicle is detected. The invention also provides a sure way of detecting stolen vehicles since, in principle, a parked vehicle that does not respond to interrogations from a mobile reader could also be considered to be a suspect vehicle.

BRIEF DESCRIPTION OF THE DRAWINGS

Other features and advantages of the invention will be understood more clearly from the following description, made with reference to the appended drawings, of which.

DETAILED DESCRIPTION OF THE PREFERRED EMBODIMENTS

Figure 1:
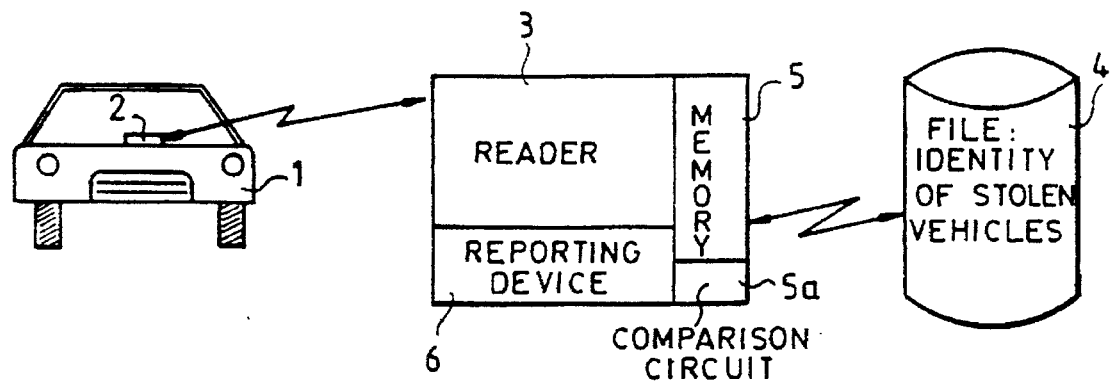
FIG. 1 is a drawing that illustrates the process of identification and automatic detection of stolen vehicles according to the invention.

According to the invention, each vehicle bearing the reference 1 in FIG. 1 has an electronic label arranged so as to respond to interrogation signals sent out by a reader 3 when activated by authorized persons such as policemen, constables, customs officials or insurance company staff concerned with the detection of stolen vehicles. The response of the label 2 takes the form of encoded signals that make it possible, by means of decoding done in the reader 3, to identify the vehicle through its registration number for example. The interrogation of the label 2 by the reader 3 is activated as desired by each authorized person when the reader is within radioelectrical range of the transmission circuit of the label 2. To enable the identification of a stolen vehicle, a copy of a file 4 for the identification of the stolen vehicles is recorded in a memory 5 of the reader 3. This copy enables a comparison circuit 5a to make a comparison of the identity of an interrogated vehicle 1 with the identities of the stolen vehicles kept in the copy of the file 4 which is stored in the memory 5 to ascertain whether or not the identity of the interrogated vehicle belongs to the list in the file 4 of stolen vehicles. The reader 3 also comprises a reporting device 6 which can be used to report the identity of a stolen vehicle to an authorized person who has this reader. This authorized person can then take every necessary step to enable the recovery by the owner, of his stolen vehicle and to update the file 4 of identities of stolen vehicles.

Figure 2:
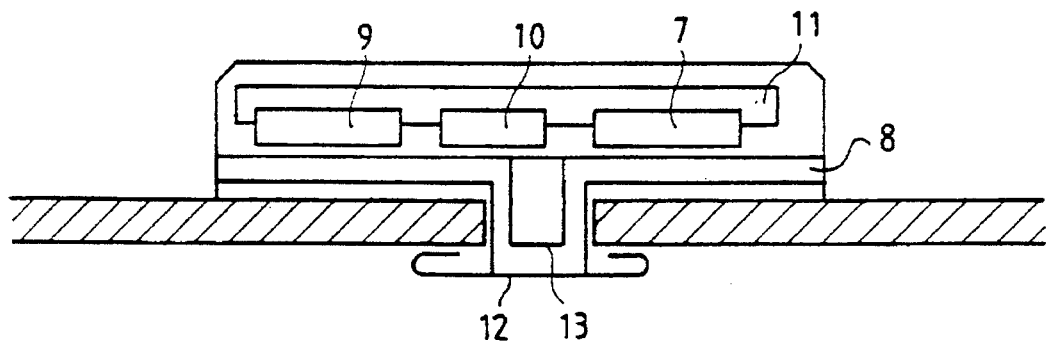
FIG. 2 is a sectional view of an electronic label implemented in the system according to the invention.

The label 2 may be made in the way shown in FIG. 2. According to this embodiment, the label has an integrated circuit supplied by a cell or battery 7 fixed to a substrate 8. The integrated circuit comprises, in a known way, a programmable read-only memory 9 coupled to a transceiver device 10 connected to an antenna 11. The substrate 8 has a fastening base 12, in the form of a rivet for example, to enable the fastening of the label to a metal plate of the vehicle. A detection wire 13 is embedded in the substrate 8 and is connected in the base 12 to the electronic circuitry of the integrated circuit in order to completely deactivate the label during any attempt to take out the label 2.

Figure 3:
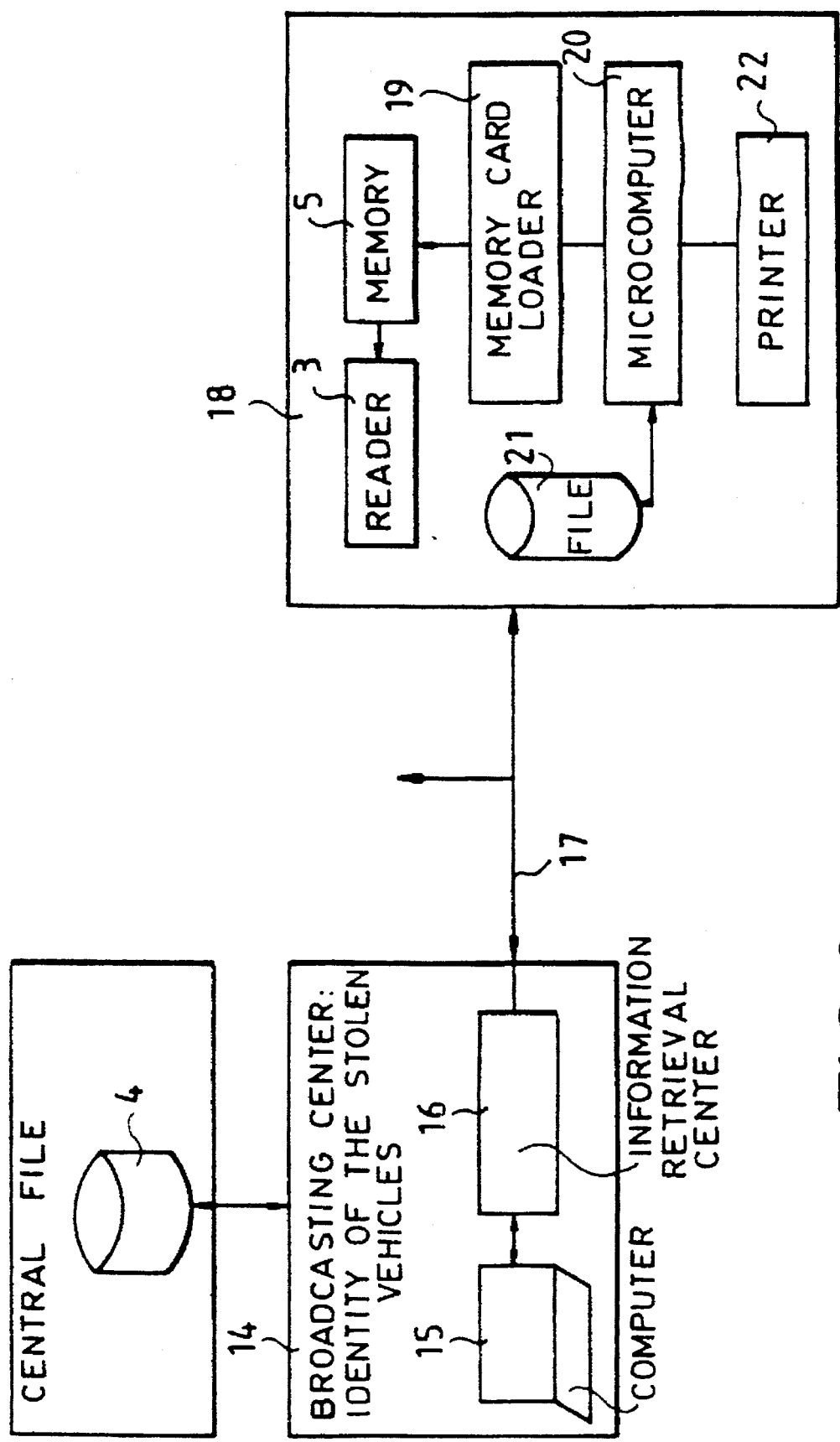
FIG. 3 shows a general architecture of a system for the identification and detection of stolen vehicles according to the invention.

To deploy the system just described throughout a territory, it must be complemented by arrangements of the type shown in FIG. 3, where the elements homologous to those of FIG. 1 are shown with the same references. For, it would be judicious here to plan for the updating of the file of stolen vehicles to be done from a center 14 for the broadcasting of the identities of the stolen vehicles. This center could be constituted, for example, by a computer 15 connected to an information retrieval center 16 for the broadcasting, on an information transmission network 17, of information elements relating to the identities of stolen vehicles, these information elements being sent to user stations 18 spread out over the territory. These user stations which are placed at the disposal, for example, of police force or constabulary units, are aimed at the updating of the memory 5 of the readers 3. To this end, the memory 5 may advantageously (and not exclusively) be formed by a removable memory chip card comprising the above-described circuit for the comparison of identities and a programmable read-only memory that is loaded by a memory card loader 19 connected to a microcomputer 20. This arrangement enables the user station 18 to collect the information on the identities of the stolen vehicles, sent out on the transmission network 17, in a file 21 addressed by the microcomputer 20. A printer 22 connected to the microcomputer 20 enables the file of the identities of the stolen vehicles to be printed out on paper.

Figure 4:
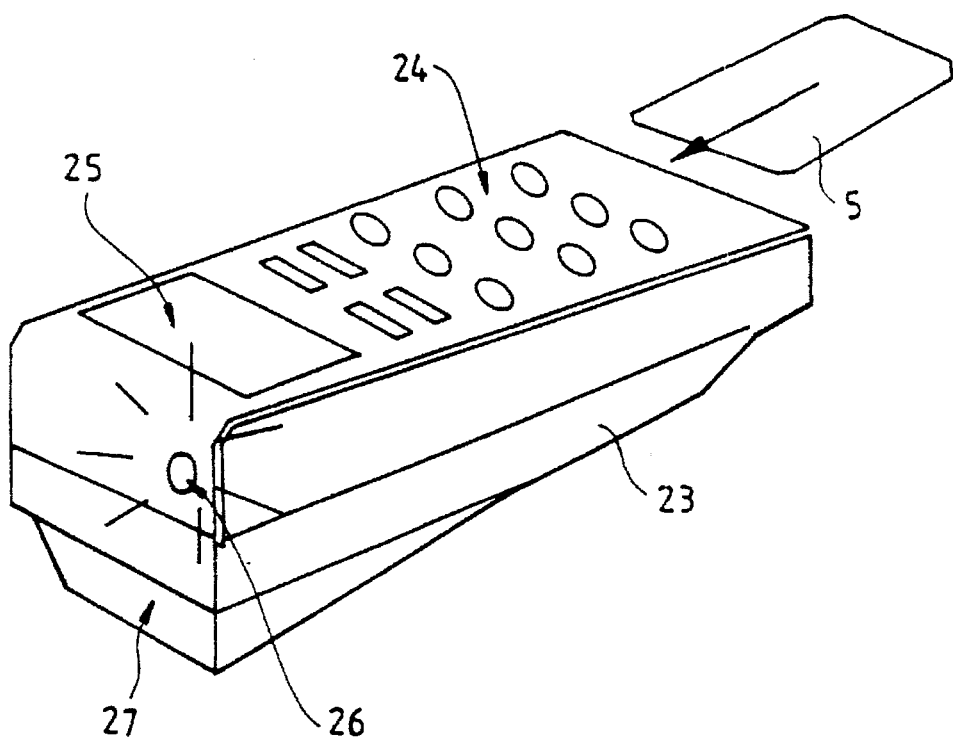
FIG. 4 shows a view in perspective of an electronic label reader according to the invention.

As a result, each reader 3 may possess, in memory, its own file on the identity of the stolen vehicles. This file is loaded into the removable memory card 5. The updating of the memory 15 may be done by the user station 18, preferably on a daily basis, for example each time that a team or person leaves on a surveillance mission. The broadcasting center 14 may be re-updated at any time, daily for example, by means of data elements on the identity of the stolen vehicles, memorized in the identity file 21 of the user station. The broadcasting center 14 is connected to the central file 4 so as to be capable of filtering and quantifying the information elements that it receives in order to transmit, for example, only the identity numbers of the vehicles stolen over a determined period of time. The readers 3 are structured in the manner shown in FIG. 4. Their ergonomy is adapted to enable their use by motorized or foot patrols. To this end, each reader 3 possesses a case 23 having a keyboard 24 overlaid on one of its faces, to enable the carrier of the reader 3 to introduce, for example, a personal access code and various control data elements. It also has a display screen 25, a beeper 26 and access means that cannot be seen in the perspective view of FIG. 4 for the introduction of the memory cards. A carrying handle 27 is made so that the reader can be carried by motorized or foot patrols.

A logic circuit internal to the reader 3 (not shown) can be used, for example, to make the requests for identification in a routine and automatic way. This enables a method of operation where only vehicles provided with labels within range of communication with a reader 3 can respond by their own identification number which can thus be displayed automatically on their screen 25. The beeper 26 can be used to inform the patrol, almost instantaneously, about the presence of one or more stolen vehicles. The patrol can then read the identity of the stolen and detected vehicle on the screen and contact its base station by radio to trigger action in order to recover the vehicle for example.

According to a first alternative embodiment of the invention, the reader 3 can also be integrated into a service terminal placed in a police station or insurance office to enable, for example, the purchasers of a second-hand car to make sure, before any purchase, that the vehicle has not already been listed as being stolen. The advantage of this arrangement is that, with each vehicle to be checked being parked in front of the terminal, it makes it possible, after an automatic reading of the identity of the vehicle and a search in the file containing the identities of the vehicles, to inform the purchaser automatically about the legality of his purchase. This arrangement is also valid for checks to identify vehicles coming into a pound or wreckage dump.

According to a second alternative embodiment of the invention, the system can be adapted to the checking of the identity of motorists to ascertain that they are truly entitled to drive their vehicles. To do this, there is provision for the integration, into the reader 3, of a device for the reading of chip cards possessed by drivers: these may be identity or insurance cards in which the identities of the drivers and the data elements relating to the vehicles are memorized. The control operation then consists in comparing the two identities of the vehicle and of each chip card read and of displaying the result thereof.

Figure 5:
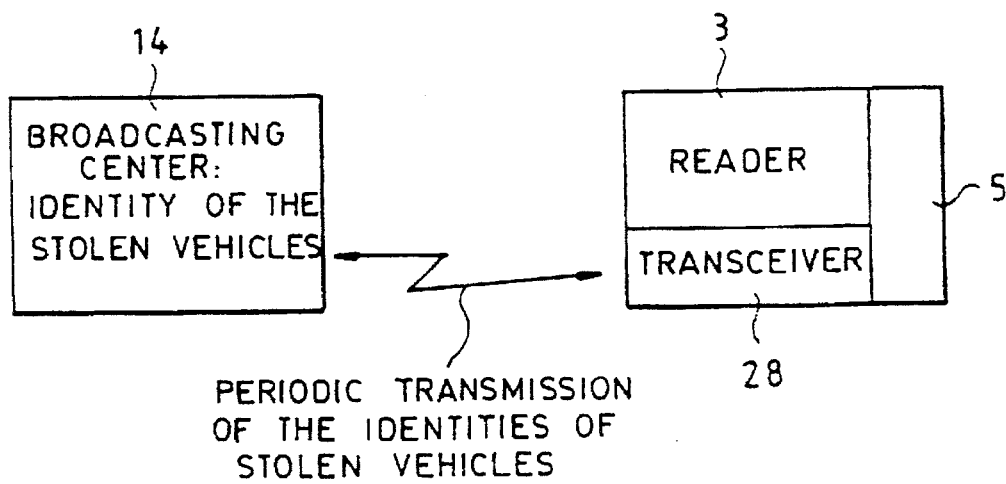
FIG. 5 shows an illustration of the process for the periodic re-updating, by radio, of the file of the reader according to the invention.

Finally, according to yet another variant, the system may again be adapted to enable a periodic re-updating, by radio, of the file 5 of the readers as shown in FIG. 5, where the elements similar to those of FIGS. 1 and 3 are shown with the same references. According to this embodiment, the readers are connected by radio to the broadcasting center 14 by means of a transceiver contained inside their case 23. This arrangement makes it possible for all the readers 3 to regularly receive reports on changes relating to the identities of vehicles stolen during the day and thus provides for more efficient controls.

What is claimed is:

1. A system for the identification and automatic detection of objects, comprising:
    an electronic label installed in each of said objects, each electronic label having means for memorizing an identification code assigned to an object in which said electronic label is installed, and radioelectrical transmission and reception means for automatically transmitting said identification code upon receipt of a prompt signal; and
    at least one mobile reader disposed exterior to said objects and movable within a vicinity thereof, each of said at least one mobile reader including
        a recording memory for recording a file of identification codes of said objects to be identified;
        radioelectrical means for transmitting said prompt signal to said radioelectrical transmission and reception means of at least one of said objects which prompts each of said radioelectrical transmission and reception means to transmit an identification code assigned to an object in which it is installed to said radioelectrical means;
        comparison means for comparing said identification codes recorded in said file with said identification code transmitted by each of said radioelectrical transmission and reception means; and
        reporting means for reporting the presence of any of said objects whose identification code appears in said file of said recorded memory and was transmitted by said radioelectrical transmission and reception means, as determined by said comparison means.

2. A system according to claim 1, further comprising broadcasting center for updating said identification codes recorded in said file of said recording memory.

3. A system according to claim 2, wherein said broadcasting center is connected to user stations, at which each of said at least one mobile reader is provided, by an information transmission network.

4. A system according to claim 2, wherein said broadcasting center comprises a computer connected to an information retrieval center.

5. A system according to claim 3, wherein each of said user stations comprises means for updating said recording memory of each of said at least one mobile reader.

6. A system according to claim 5, wherein said recording memory comprises a removable memory card which is removable from said at least one mobile reader by a user.

7. A system according to claim 6, wherein said removable memory card comprises said comparison means.

8. A system according to claim 7, wherein each of said at least one mobile reader is integrated into one of a plurality of service terminals positioned at predetermined locations within said vicinity of said objects.

9. A system according to claim 8, wherein each of said at least one mobile reader comprises a case having a keyboard overlaid on a surface thereof, a display screen, a beeping indicator, and access means for the introduction of said removable memory card.

10. A system according to claim 9, wherein each of said at least one mobile reader comprises a transceiver for periodically updating identification codes of stolen objects in said recording memory.

11. A system according to claim 1, wherein each of said electronic labels comprises a programmable read only memory coupled to a transceiver device which is connected to an antenna.

12. A system according to claim 1, wherein said objects are vehicles.

* * * * *